Aug. 9, 1949.  L. ARMSTRONG ET AL  2,478,618
PACKAGED FOOD COMPOSITION
Filed Aug. 4, 1948
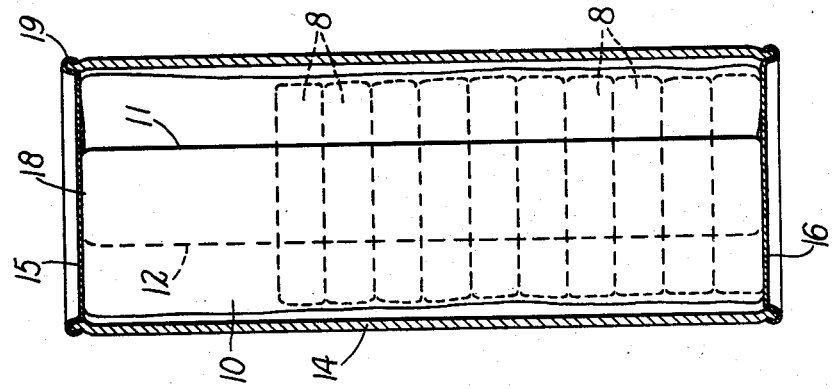
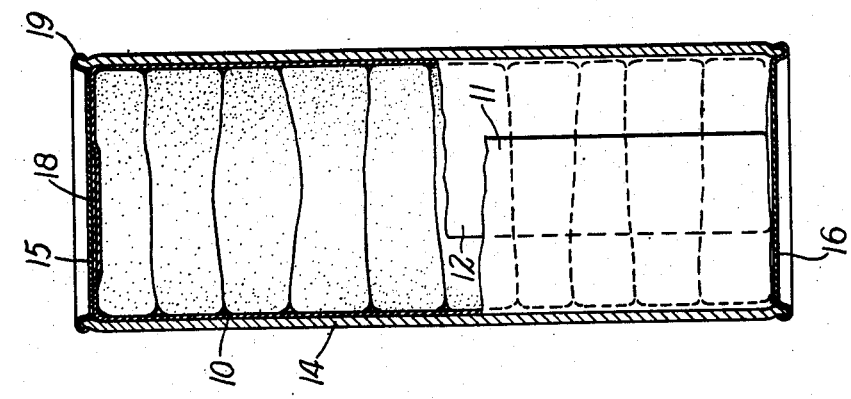
INVENTORS
Lowell Armstrong
Lively B. Willoughby
BY
Blair, Curtis + Hayward
ATTORNEYS Patented Aug. 9, 1949

2,478,618

UNITED STATES PATENT OFFICE 2,478,618

PACKAGED FOOD COMPOSITION

Lowell Armstrong and Lively B. Willoughby, Louisville, Ky., assignors to Ballard & Ballard Company, Louisville, Ky.

Application August 4, 1948, Serial No. 42,486

9 Claims. (Cl. 195—172)

This invention relates to a packaged pre-leavened dough suitable for distribution through ordinary food merchandising channels and prepared ready for baking by the housewife. More particularly the invention relates to a packaged dough of the type having a pre-formed body or bodies of dough substantially filling the package. The dough may be divided into smaller pre-formed bodies separated within the package so that, when it is opened, these separate bodies may be readily distributed on a pan or griddle, etc., for baking or other types of cooking. The dough is protected in the package against excessive loss of water and of leavening gas by a substantially impervious wrapping contained within a pervious but mechanically strong container.

Packaged foods of the general type to which the present invention relates are described and claimed in the prior patent of Lively B. Willoughby 1,811,772 of June 23, 1931, reissued April 19, 1932, No. 18,426; and the present invention constitutes an improvement on the invention described and claimed in said prior patent and reissue. The present application is a continuation-in-part of our application Serial No. 598,450, filed June 9, 1945, now abandoned.

Although the invention described in the prior patent was soon brought into commercial use and has proven an important contribution to the practical art, nevertheless certain difficulties were experienced requiring precautions in handling and not infrequently spoilage or loss which reduced to some extent the profit from the use of the patented invention. In particular, it was found that if the evolution of gas in the package is too low or is exhausted before it is opened, the sealing pressure on the wrapping may not be maintained so that the desired leavening action may be impaired when the package is opened and the dough used for baking, or spoilage may occur in the package. Moreover, too rapid evolution of gas, if not diffused through the walls of the package may result in an internal gas pressure so high as to explode the package. For carefully controlled local distribution, these conditions can be and have been largely controlled by refrigeration, the packaged dough being handled in storage and transit in much the same manner as is customary for perishable foods such as butter, yeast, etc. Temporary failures of refrigeration or carelessness in handling, however, have resulted in loss of the leavening gas or a building up of excessive pressure within the package which may not be immediately apparent and which when not detected by those responsible for the distribution of the products has caused dissatisfaction of the ultimate consumer. Substitution of less active leavening agents did not prove promising. They may avoid excessive pressures, but in general they fail to maintain a satisfactory dough condition or a sufficient gas pressure in the package during storage and distribution.

It is, therefore, an object of the present invention to improve these products in these respects and to avoid, so far as possible, deterioration of the products during storage and transit and particularly to avoid excessive loss of leavening gas and to avoid excessive generation of gas pressure within the package, while at the same time maintaining a gas pressure sufficient to avoid spoilage within the container under normal conditions and to assure a pre-leavened condition within the dough. A further object is to assure the maintenance of a sufficient unexpended reserve of the leavening agent within the dough to produce the desired additional leavening of the product during baking. The package need not be sealed perfectly impermeable to moisture and carbon dioxide, but the overlapping edges of the wrapper are sufficiently sealed, by pressure between the expanding dough and the supporting container, to entrap the moisture and leavening gas in the dough within the package.

When a baking compound containing releasable carbon dioxide and a compound which reacts therewith to release the carbon dioxide are combined in a moist dough, a chemical interaction occurs which like other chemical reactions tends to proceed to an equilibrium at which certain proportions of the original reactants and products of the reaction occur side by side. With ordinary leavening agents such equilibrium does not occur with a $CO_2$ pressure which can be feasibly contained within a package of the type referred to above, and therefore either the gas pressure becomes excessive or is too soon exhausted. If carbon dioxide gas, one of the products of the reaction, is allowed too free escape, the equilibrium is upset and the reaction tends to proceed, using up additional quantities of the reacting compounds.

In ordinary baking powder or leavening compositions, a non-toxic carbonate, usually sodium bicarbonate (ordinary "baking soda"), serves as the compound adapted to release carbon dioxide gas; and an acid salt or weak acid, for example, calcium or sodium acid phosphate, alum, potassium acid tartrate, tartaric acid and other well-known baking acids, are used to release the carbon dioxide of the carbonate. Extensive experiment with the various baking powders and especially with various acid substances known to be suitable for releasing carbon dioxide has disclosed no apparent correlation between their chemical nature and the extent to which they cause or overcome the difficulties referred to above. It is now discovered, however, that sodium acid pyrophosphate and glucono delta lactone used with ordinary carbon dioxide releasing compounds produce a distinctive dough condition and a slow steady reaction rate which is extremely desirable in a packaged dough of the type set forth, and which is not produced by other baking acids, so far as is now known.

These two acidic materials, although not entirely equivalent, may be used together in any proportions or separately. The predominant gas-forming reactions should be between the carbon dioxide bearing compound and one or both of these two acidic compounds. Small amounts of other acids may be present, but the amount of such other acid must not be so great as to give excessive total pressure or so quickly exhaust the $CO_2$ as to leave an insufficient pressure during normal storage. The initial leavening of the dough may be primarily by a different leavening agent, whether an ordinary baking powder or yeast or other gas-forming organisms, but in such case the initial leavening action resulting from such other agents should be substantially exhausted or inhibited before the packaged dough leaves the carefully controlled conditions of the manufacturing plant and enters the channels of distribution. In particular it is essential that the dough be free from living gas-forming micro-organisms when it is sent out; and, if yeast or other organic growth is initially used as leavening means, further activity of such organisms should be inhibited. It is essential to the present invention that there should be added to the dough sufficient leavening agents consisting of a carbon dioxide bearing compound and said sodium pyro phosphate and/or glucono delta lactone baking acid compounds to continue a slow evolution of carbon dioxide within the dough after expanding it to the full capacity of the package, and throughout its transit and storage. The residual amount of the leavening agent after the packaged dough reaches the consumer, will ordinarily be sufficient for additional leavening during baking but one may, if desired, use an additional agent which becomes effective under baking conditions, but is more stable under normal storage and shipping conditions.

The invention is applicable to all types of leavened dough and is highly advantageous for use in any such product where the quality and/or flavor of finished food made from the dough is superior when freshly cooked, so that the consumer will prefer to purchase the dough in form and condition ready for immediate cooking rather than to purchase the cooked food and warm it over. The dough may be in rolls, discs, etc., or in any form and size found convenient for merchandising and for which a satisfactory container has been provided.

In the accompanying drawings, we have shown one embodiment of the invention.

Figure 1 is a view of the packaged food as it appears on the market, but with half of the outer container cut away to disclose in elevation the contents in its wrapping, and said wrapping broken away at one end to disclose the contents;

Figure 2 is a view in axial section of a similar package as initially filled and before expansion of the dough to fill the container.

In producing the product shown in the drawing, a biscuit dough may be made, for example, in accordance with the following formula (all percentages by weight):

| | Per cent |
|---|---|
| Flour | 52.5 |
| Buttermilk | 34 |
| Shortening | 9 |
| Sugar | 0.5 |
| Salt | 1.4 |
| Sodium bicarbonate | 1.2 |
| Sodium acid pyrophosphate ($Na_2H_2P_2O_7$) | 1.4 |

These ingredients are mixed in the usual way in accordance with ordinary bakery practice. The resulting dough is rolled out and cut, extruded or molded to discs 8 (Figure 2) about ¼" in thickness and 2" in diameter. Each is covered with shortening or other coating or sheet material adapted to permit ready separation of the individual discs of the dough when the package is opened. These discs are then assembled one on top of the other and wrapped with a sheet 10 which is relatively impermeable to moisture and carbon dioxide, for example Pliofilm, glassine paper, moisture-proof cellophane, aluminum foil, tin foil, or other corrosion resistant, non-toxic metal foil, or various laminates made up of two or more such materials assembled or bonded together. This wrapping is made with freely overlapping edge portions 11, 12, unbonded so that, upon expansion of the dough within the wrapping, these edges may first slip over one another until the wrapping is perfectly fitted to the inside of an outer supporting container and then the edges are pressed together by the expansive pressure of the dough so as effectively to seal them.

The stack of discs of dough covered with the wrapper and with preferably only one end of the wrapper folded over the bottom of the stack is then inserted into a cylindrical can or carton; and the other end of the wrapper is then folded to close the top 18 of the wrapper at the top of the container and the cap 15 is fitted over the container tube 14 and secured in place by crimping the edge 19 as shown. This external container is preferably of cardboard permeable to air, or, if of an impermeable material such as metal, is provided with openings or gas leaks such that any air entrapped between the wrapper and the container can escape when the dough is expanded within the package. In any case, the external container is adapted to afford adequate support against the expansive pressure of the gas generated in the dough. As shown, the can consists of a spiral-wound cylindrical cardboard tube 14 with tin plate ends 15 and 16 clamped thereon. This carton can be opened by cutting with a sharp knife just below the metal cover and then tearing off the spiral cardboard strip. In other cases we omit the inner wrapper 10 as such and embody it in the tube 14 by making the inner spiral winding of aluminum foil or other impermeable material such as mentioned above. The edges of such spiral winding may be overlapped with effect similar to the overlapping of edges 11 and 12.

As indicated above the ingredients before and during mixing, and the dough subsequent to mixing, should be carefully treated to exclude, destroy or inhibit all gas-forming micro-organisms, since the present invention is concerned with the production of leavening gas at a special rate and to a special equilibrium condition most desirable for this type of package; and, although the particular chemicals used according to the present invention can accommodate a small production of carbon dioxide from other sources, a greater organic activity may produce an excessive amount of carbon dioxide at an uncontrolled rate which would overcome the important advantages of the present invention.

In the above formula the buttermilk and a part of the soda combine to give an initial rapid evolution of carbon dioxide gas under controlled conditions of the factory so as to build up the internal pressure in the package necessary to give good keeping qualities and a good texture for immediate baking; whereas the sodium acid pyrophosphate and an equivalent of sodium bicarbonate, which is in addition to that used by the buttermilk, give the slow, continuous evolution of gas required to maintain the pressure necessary to preserve the dough in the package and keep it in the desired condition for baking.

In the above formula, the sodium acid pyrophosphate is 2.66% by weight of the flour used, and this gives 0.97% of $CO_2$ released by the sodium acid pyrophosphate (based on the weight of the flour). This amount can be increased without disadvantage to the point where the taste of the leavering agent would be noticeable and it may be decreased with almost equivalent results as low as 0.86% of $CO_2$ released by the special leavening agent (on the same basis). Below that, biscuits can be made and distributed successfully as low as 0.775% of released $CO_2$ released by the special leavening agent but only at the expense of increased precautions in handling and storage or decreased quality or both. Tests have shown that less than this does not give the good keeping qualities characteristic of the invention. In general the same limits apply with glucono delta lactone instead of or together with the sodium acid pyrophosphate as the special leavening agent.

As another example of a biscuit dough which may be used instead of that described above and in the same manner: The sodium acid pyrophosphate is replaced by 1.65% glucono delta lactone

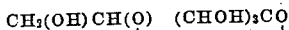

and the percentage of flour is reduced to 52.25 of the composite dough. If desired, mixtures of these two baking acids may be used in any proportion taking an equivalent amount of the mixture; and the difference in total amount made up by a slight change in the proportion of flour.

As will be evident, the use of buttermilk in this formula gives an initial leavening action due to reaction between the lactic acid of the buttermilk and the sodium bicarbonate. This is desirable but not essential. Other quickly exhausted initial leavening acids can be used with sweet milk or with other liquids, or the sodium acid pyrophosphate and the glucono delta lactone can be relied upon solely for the leavening action, and the initial evolution of gas can be hastened by brief storage at room temperature or higher before chilling. In any case this initial quicker leavening action should be substantially exhausted or inhibited before the packaged dough leaves the carefully controlled conditions of the manufacturer's plant.

As will be apparent from what has been said above, the two biscuit doughs specifically described above, although highly advantageous, are only two examples out of the many which could be given to illustrate the invention. With the foregoing in view it will be evident to those skilled in the bakery art that the invention may be applied to numerous bakery products including rolls, bread, cookies, cakes, crullers, pancakes, dumplings, etc.

We claim:
1. The method of preparing a dough for distribution which comprises incorporating in the dough at least one of the slow-acting baking acids from the group consisting of sodium acid pyrophosphate and glucono delta lactone in amount greater than that equivalent to 0.775% of carbon dioxide released thereby from the carbonate (based on the weight of the flour in said dough) and a baking carbonate in amount at least equivalent to said 0.775% $CO_2$, packaging the dough in a container adapted to limit expansion of the dough, subjecting the packaged dough to conditions adapted to produce relatively rapid evolution of gas within the dough, and substantially terminating such relatively rapid evolution of gas when the dough has expanded sufficiently to be restrained by the container and when a substantial unexhausted reserve of gas-releasing baking compound and of said slow-acting baking acid remains in the dough.

2. The method of preparing a dough for distribution which comprises incorporating in the dough at least one of the slow-acting baking acids from the group consisting of sodium acid pyrophosphate and glucono delta lactone in amount greater than that equivalent to 0.86% of carbon dioxide released thereby from the carbonate (based on the weight of the flour in said dough) and a baking carbonate in amount at least equivalent to said 0.86% $CO_2$, packaging the dough in a container adapted to limit expansion of the dough, subjecting the packaged dough to conditions adapted to produce relatively rapid evolution of gas within the dough, and substantially terminating such relatively rapid evolution of gas when the dough has expanded sufficiently to be restrained by the container and when a substantial unexhausted reserve of gas-releasing baking compound and of said slow-acting baking acid remains in the dough.

3. The method of preparing a dough for distribution which comprises incorporating in the dough at least one of the slow-acting baking acids from the group consisting of sodium acid pyrophosphate and glucono delta lactone in amount approximately equivalent to 0.97% of carbon dioxide released thereby from the carbonate (based on the weight of the flour in said dough) and a baking carbonate in amount at least equivalent to said 0.97% $CO_2$, packaging the dough in a container adapted to limit expansion of the dough, subjecting the packaged dough to conditions adapted to produce relatively rapid evolution of gas within the dough, and substantially terminating such relatively rapid evolution of gas when the dough has expanded sufficiently to be restrained by the container and when a substantial unexhausted reserve of gas-releasing baking compound and of said slow-acting baking acid remains in the dough.

4. The method of preparing a dough for distribution which comprises incorporating in the dough sodium acid pyrophosphate and glucono delta lactone in amounts which together are at least equivalent to 0.86% of carbon dioxide released thereby from a carbonate (based on the weight of flour in said dough) and such baking carbonate in amount at least equivalent to said 0.86% $CO_2$, packaging the dough in a container adapted to afford mechanical support to the dough and to limit expansion of the dough, subjecting the packaged dough to conditions adapted to produce relatively rapid evolution of gas within the dough, and substantially terminating such relatively rapid evolution of gas when the dough has expanded sufficiently to be restrained by the container and when a substantial unexhausted reserve of gas-releasing baking compound and of said slow-acting baking acid remains in the dough.

5. The method of preparing a dough for distribution which comprises incorporating in the dough sodium acid pyrophosphate in amount at least equivalent to 0.86% $CO_2$ (based on the weight of flour in said dough) released thereby from a carbonate and a baking carbonate in amount at least equivalent to said 0.86% $CO_2$, packaging the dough in a container adapted to afford mechanical support to the dough and to entrap moisture and carbon dioxide gas therein but without completely preventing loss of such gas, subjecting the packaged dough to conditions adapted to produce relatively rapid evolution of gas within the dough, and terminating such rapid evolution of gas before delivering the packaged dough into channels of distribution and when substantially the only leavening agent remaining in the dough is a substantial unexhausted reserve of said baking carbonate and of said sodium acid pyrophosphate.

6. The method of preparing a dough for distribution which comprises incorporating in the dough glucono delta lactone in amount at least equivalent to 0.86% $CO_2$ (based on the weight of flour in said dough) released thereby from a carbonate and a baking carbonate in amount at least equivalent to said 0.86% $CO_2$, packaging the dough in a container adapted to afford mechanical support to the dough and to entrap moisture and carbon dioxide gas therein but without completely preventing loss of such gas, subjecting the packaged dough to conditions adapted to produce relatively rapid evolution of gas within the dough, and terminating such rapid evolution of gas before delivering the packaged dough into channels of distribution and when substantially the only leavening agent remaining in the dough is a substantial unexhausted reserve of said baking carbonate and of said glucono delta lactone.

7. The method of preparing a dough for distribution which comprises incorporating in the dough at least one of the slow-acting baking acids from the group consisting of sodium acid pyrophosphate and glucono delta lactone in amount at least equivalent to 0.86% (based on the weight of flour in said dough) of carbon dioxide released thereby from a baking carbonate, and a baking carbonate adapted to release carbon dioxide gas in the presence of acid and in amount at least equivalent to said 0.86% $CO_2$, packaging the dough in a permeable container adapted to afford mechanical support to the dough and to limit its expansion and in a flexible wrapper adapted to entrap moisture and leavening gas therein and with overlapping edge portions lying flat against the permeable container, subjecting the packaged dough to conditions adapted to produce relatively rapid evolution of gas within the dough, and substantially terminating such relatively rapid evolution of gas when the dough has expanded sufficiently to be restrained by the container and while a substantial unexhausted reserve of gas-releasing baking compound and of said slow-acting baking acid remains in the dough.

8. The method of preparing a dough for distribution which comprises incorporating in the dough at least one of the slow-acting baking acids from the group consisting of sodium acid pyrophosphate and glucono delta lactone in amount at least equivalent to 0.86% (based on the weight of flour in said dough) of carbon dioxide released thereby from a baking carbonate, and a baking carbonate adapted to release carbon dioxide gas in the presence of acid and a quicker acting leavening agent, packaging the dough in a container adapted to afford mechanical support to the dough, to limit expansion of the dough and to entrap moisture and leavening gas therein, subjecting the packaged dough to conditions adapted to promote action of said quicker acting agent to produce relatively rapid evolution of gas within the dough, and substantially terminating such rapid evolution of gas when the dough has expanded sufficiently to be restrained by the container and while a substantial unexhausted reserve of gas-releasing baking compound and of said slow-acting baking acid remains in the dough.

9. The method of preparing a dough for distribution which comprises incorporating in the dough at least one of the slow-acting baking acids from the group consisting of sodium acid pyrophosphate and glucono delta lactone in amount at least equivalent to 0.86% (based on the weight of flour in said dough) of carbon dioxide released thereby from a baking carbonate, and lactic acid in amount sufficient to expand the dough to substantial pressure in the container hereafter named, and a baking carbonate adapted to release carbon dioxide gas in the presence of acid and in amount at least equivalent to said 0.86% $CO_2$ plus the equivalent of said lactic acid, packaging the dough in a container adapted to afford mechanical support to the dough, to limit expansion of the dough and to entrap moisture and carbon dioxide gas therein, subjecting the packaged dough to conditions adapted to promote action of said lactic acid to produce relatively rapid evolution of gas within the dough, and substantially terminating such rapid evolution of gas before delivering the packaged dough into channels of distribution and while a substantial unexhausted reserve of gas-releasing baking compound and of said slow-acting baking acid remains in the dough.

LOWELL ARMSTRONG.
LIVELY B. WILLOUGHBY.

No references cited.